PHOTOGRAPHY USING SPATIAL FILTERING

Original Filed April 28, 1967 3 Sheets-Sheet 1

INVENTOR
ALBERT MACOVSKI
BY Samuel Lindenberg
ATTORNEY

INVENTOR.
ALBERT MACOVSKI
BY Lindenberg & Freilich
ATTORNEYS

PHOTOGRAPHY USING SPATIAL FILTERING

Original Filed April 28, 1967 3 Sheets-Sheet 3

54 56 ZERO ORDER IMAGE OF POINT SOURCE (NOT NORMALLY USEFUL)
FIRST ORDER DIFFRACTED IMAGE (USEFUL)
LOWEST ORDER "CROSS-PRODUCT" DIFFRACTED IMAGE (NOT USEFUL)
SECOND ORDER DIFFRACTED IMAGE (USEFUL)

INVENTOR
ALBERT MACOVSKI
BY Samuel Lindenberg
ATTORNEY

United States Patent Office

Re. 27,491
Reissued Sept. 26, 1972

27,491

PHOTOGRAPHY USING SPATIAL FILTERING

Albert Macovski, Palo Alto, Calif., assignor to Stanford Research Institute, Menlo Park, Calif.

Original No. 3,504,606, dated Apr. 7, 1970, Ser. No. 651,077, Apr. 28, 1967, which is a continuation-in-part of Ser. No. 466,547, June 24, 1965. Application for reissue Oct. 15, 1970, Ser. No. 81,192
Int. Cl. G03b *29/00, 33/00*
U.S. Cl. 95—12.2 13 Claims

Matter enclosed in heavy brackets [ ] appears in the original patent but forms no part of this reissue specification; matter printed in italics indicates the additions made by reissue.

ABSTRACT OF THE DISCLOSURE

There is provided by this invention a spatial filter which has the property that when it is placed adjacent to a sensitized material, such as panchromatic film of the types used in black and white photography or thermoplastic material, that the different colors of light passing through that filter onto the sensitized material are encoded. Thereafter, when the developed transparency, which is made from the sensitized material has light projected therethrough, this light may be focused at a focal plane at which there is presented three diffracted images respectively disposed about a central or real image. By using a mask with the proper colored gelatins therein, the three diffracted images only may be permitted to pass therethrough and then superimposed to form a colored image of the original scene or object which was photographed on the sensitized surface in combination with the spatial filter.

This application is a continuation-in-part of application, Ser. No. 466,547, filed June 24, 1965, now abandoned, entitled "Photography Using Spatial Filtering," by this inventor.

BACKGROUND OF THE INVENTION

Field of the invention

This invention relates to a method and means for photographing an original object with a single exposure on monochrome film in a manner so that all the color information is present and for thereafter reproducing an image of said original object in its original color.

Description of the prior art

One of the known properties of a parallel line diffraction grid or grating is that if this grating is illuminated from one side by a point source of light, and if a lens is arranged on the other side of the grating, numerous images of the point source of light, instead of a single image, will appear on a screen which is disposed at the focus of the lens. All of these various images are aligned perpendicularly to the lines of the grating and are symmetrical to a central image. The central image can be considered as the nondiffracted or low frequency image, while the images on either side of the central image are the diffracted images. If the grating is rotated so that its lines are 90° with respect to their original position, the images on either side of the central image rotate to assume a position 90° to the direction of the parallel lines of the grid and its rotated position.

Advantage of this phenomenon is taken in an arrangement described in a patent to Bocca, Reissue 20,748. The patentee therein describes how he can record all the information in a color photograph on a single black and white negative in a manner so that the color photograph may be reconstructed from the black and white negative. The patentee does this by first preparing three partial negatives of the subject which are made by projecting an image of the colored photograph through three colored filters, onto three separate negatives. From these three negatives, three corresponding diapositives are printed.

The patentee then makes a print on a black and white negative from the red diapositive through a parallel monochrome line grating with the lines being considered horizontal, for example. Thereafter, on the same negative a print is made from the green diapositive through the parallel line grating with the lines being inclined 60° to the left to the horizontal. Finally, the third diapositive is printed on the black and white negative through the parallel line grating with the lines being inclined 60° to the horizontal to the right.

For the purpose of printing the image recorded on the negative, the negative is illuminated from one side by collimated light. An objective lens placed on the other side of the negative will focus the light passing therethrough in a plane. There are three set of images placed along three different directions in that plane, which have in common the central image. The diffracted images are each formed along lines perpendicular to the direction of the lines of the grating with which the respective images were formed. A mask is inserted in the focal plane of the lens which has openings to pass therethrough only the respective diffracted images. These holes are covered with filters which color the light passing through in accordance with the color from which the diffracted image was derived. The colored images are then permitted to fall upon a sensitized emulsion whereby the original color photograph is reproduced.

OBJECTS AND SUMMARY OF THE INVENTION

An object of this invention is to provide an improved method and means of photographing a color picture on a sensitized surface which does not require a multiple exposure thereof.

Another object of the present invention is the provision of a method and means for photographing multiple color information on a black and white surface in a manner such that said information can be subsequently retrieved with a minimum of difficulty.

Another object of the present invention is the provision of a method and means for recording multiple image information on a black and white sensitized surface more simply and rapidly than has been done heretofore.

These and other objects of the present invention may be achieved in one arrangement by placing a spatial filter in accordance with this invention in a camera adjacent the sensitized material upon which a color image is to be photographed. The sensitized material may be panchromatic film of the type used in making black and white film. Alternatively, the sensitized material may be a sheet of thermoplastic material which is addressed with a photoconductive layer or may be any other substrate whose thickness is controlled by the light. An example of such a photoconductive thermoplastic material is found described in an article by N. E. Wolf entitled "Photoconductive Recording System" in the RCA Review, vol. XXV No. 2, June 1964. The filter may comprise, for example, grids of lines, each of which grids are at different angles and are superimposed upon one another, or may comprise grids of lines, each of which is differently spaced and which are interleaved, or may comprise an arrangement of adjacent Fresnel lens. For the purposes of recording three color information, one grid or Fresnel lens has lines which are cyan color, the second grid or Fresnel lens has lines of magenta color, and the third grid or Fresnel lens has lines of yellow color. The sensitized material is given a single exposure in the camera and is then processed in the usual manner. When the sheet of thermoplastic material is used, there results therein a plastic deformation proportional to light intensity. The resulting thermoplastic contains the encoded information in the form of phase gratings.

A black and white positive transparency is made from the developed photographic negative in the usual manner. The image on the transparency or on the sheet of thermoplastic material may be projected by illuminating one side with light. The light passing through the transparency or the sheet of plastic material is then passed through a lens. For the photographic transparency, the lens provides, at its focal plane, a real image of the light source, which is central with respect to three diffracted images respectively disposed about the central image, which are respectively positioned at right angles to the diffraction lines giving rise to those images. There also appear other images formed from light, diffracted by the arrays of intersections of the three original gratings with one another, and still more images formed by second order diffraction.

In the case of the material having phase or thickness variations, a greater percentage of the incident light is diffracted rather than passed through the central real image, and thus provides more light in the diffracted image than does the photographic transparency. Where the phase grating phase variations are repetitive and at $\pi$ radians, corresponding to half wave of retardation, the central image disappears. Phase recording may be made using silver halide photography and subsequent washing. Such system is found described in Kodak Pamphlet #E–P, April 1965, entitled "Kodak Dye Transfer Processes."

By a proper selection of the positional relationship of the three diffraction gratings of the original filter, the desired diffracted images appear in the focal planes of the projection lens in a manner so that the desired images are easily separated from the undesired diffraction images. This is achieved by using a mask having its center blocked and having slit openings around the center at angles which are at right angles to the diffraction gratings used in the original spatial filter. A colored gelatin is placed in each one of these holes which has a color corresponding to that of the primary colors. The result is that the light passing through the mask, when projected on a screen via a projection lens or when printed on color sensitive material, produces a picture having substantially the same color as the original color picture.

The novel features that are considered characteristic of this invention are set forth with particularity in the appended claims. The invention itself, both as to its organization and method of operation, as well as additional objects and advantages thereof, will best be understood from the following description, when read in connection with the accompanying drawings.

DESCRIPTION OF THE PREFERRED EMBODIMENTS

Figure 1:
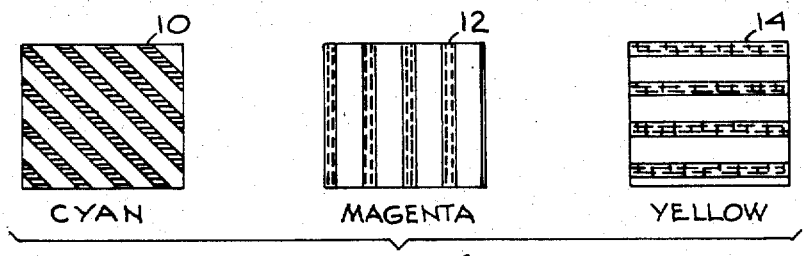
FIGURE 1 illustrates the three grids which are used in one spatial filter in accordance with this invention.
Figure 2:
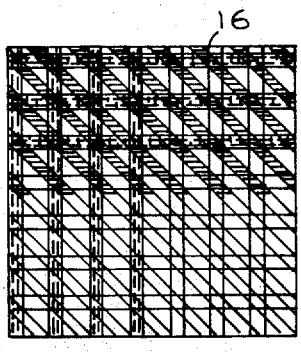
FIGURE 2 illustrates a spatial filter, in accordance with this invention, with the three grids shown in FIGURE 1 superimposed on one another.

FIGURE 1 illustrates, by way of example, three different grids or line gratings 10, 12, 14, which are superimposed to make a tartan of three superposed rulings to provide, as shown in FIGURE 2, a spatial filter illustrative of one embodiment of the invention. Each grid has its own angular orientation and the lines of the respective grids 10, 12, 14 are each in color, which are respectively selected to be the negative primaries, cyan, magenta, and yellow. The tartan in FIGURE 2 is supported on a transparent sheet and may be termed a spatial frequency encoder 16.

Figure 3:
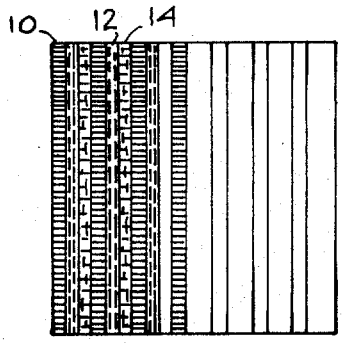
FIGURE 3 illustrates another spatial filter arrangement in accordance with this invention.

FIGURE 3 represents another arrangement for a spatial frequency encoder 16, in accordance with this invention. Here the three grids of parallel lines respectively 13, 15, 17, have different numbers of lines per inch, or, considered another way, the grids have different frequencies. These grids are superimposed on one another with the lines parallel to one another.

Figure 4:
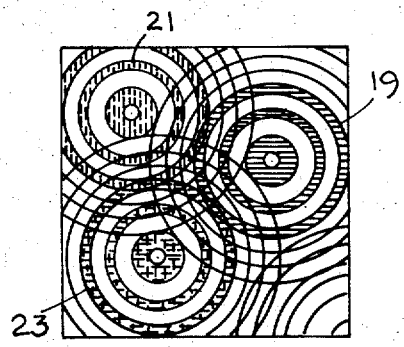
FIGURE 4 illustrates still another spatial filter arrangement in accordance with this invention.

FIGURE 4 illustrates another form for a spatial filter 16. It comprises three Fresnel lens zones 19, 21, 23, the rings of which are respectively cyan, magenta, and yellow. The lens zones may be positioned relative to one another in any convenient manner, the one shown being merely exemplary.

Figure 5:
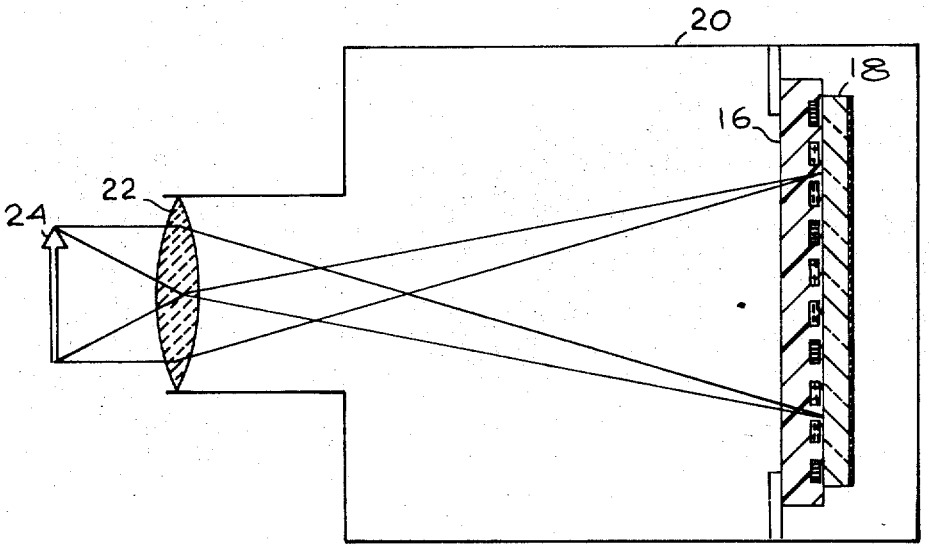
FIGURE 5 is a schematic illustration of a camera equipped with a spatial filter.
Figure 5A:
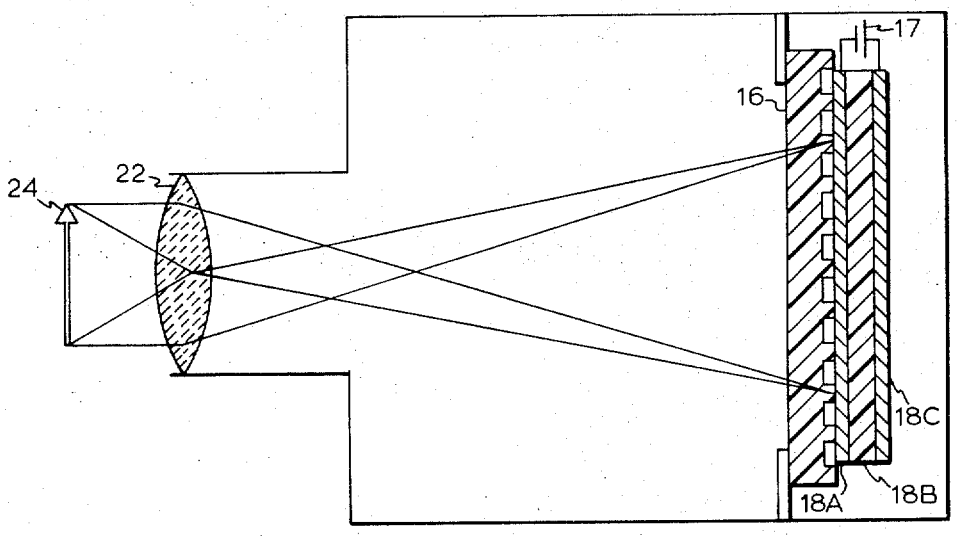
FIGURE 5A is a schematic illustration of a camera equipped with a spatial filter and a thickness variable sensitized material.

To take a color photograph, in accordance with this invention, as shown schematically in FIGURE 5, a conventional still or motion picture camera is modified by inserting the filter 16 directly in front of the sensitized sheet of material 18 within the camera 20. As previously stated, this sheet of material may either be panchromatic film or a sheet of thermoplastic material, having a photoconductive layer on the surface adjacent the filter 16. As shown in FIGURE 5A, a potential source 17 representative of any suitable surface charging means is connected between the photoconductive layer 18A and the transparent conductive layer 18C on the back surface of the thermoplastic material 18B. The photoconductive layer may be removed after the exposure to leave a translucent thermoplastic sheet, if the photocondutive layer is not made transparent to begin with. The potential source may be omitted if the photoconductive layer is precharged, as by corona charging.

The lens 22 focuses the object 24 being photographed on the sensitized material in the customary manner. The single filter remains fixed in the camera while successive exposures of different objects may be made on successive portions of the sensitized material in the customary manner. The single filter remains fixed in the camera while successive exposures of different objects may be made on successive portions of the sensitized material which is transported behind the filter, identically in the manner present-day cameras are operated.

In an embodiment of the invention, which was constructed and successfully operated, a spatial filter was prepared on color film designated by the Kodak Company as "Ektacolor" (a negative) print film. The exposure of the film was made using colored lights (red 25, green 58, blue 47) through 300 line per inch Ronchi gratings. However, if desired, the grids may also be either printed on glass or an transparent plastic by dye transfer or by an equivalent printing process. It should be noted that the insertion of the filter 16 does not have any adverse effect on the quality of black and white photographs which may be derived from the negative, provided the negative is not over-enlarged.

In the case of the film, after a conventional processing of the exposed negative, a positive transparency on black and white film is made, in a manner well known to the art. The effect on the final positive transparency of the filter in the camera is as follows. The images of red objects (which are shown as grey on the positive) have superimposed on them a fine grid of line shadows oriented at the angle (if any) of the cyan ("minus red") lines of the filter. This result is due to cyan dye being opaque to red light while magenta and yellow dyes are transparent. Similarly, green and blue portions of the scene record as grey with superposed line shadows oriented at the angles (if any) of the magenta ("minus green") and yellow ("minus blue") lines of the filter, respectively. The spaces between the dark lines have grey scale densities appropriate to the brightness of the object photographed. Colors (e.g. yellow, purple, white, etc.) which are additive combinations of the foregoing primaries, become encoded with superposed gratings that are additive combinations of the codes of the appropriate primaries. The Fresnel lens type spatial filter will have three images corresponding to the three Fresnel zones with rings on them, the cyan zone placing rings on the red image, the magenta zone placing rings on the blue image, and the yellow zone placing rings on the green image.

In the case of the thermoplastic material, it is left with plastic deformations proportional to the light intensity across the surface thereof, with the result that the photographic information is recorded as phase gratings.

It should be noted that in order to obtain satisfactory photographs, in accordance with this invention, in the camera the space between the film emulsion or photoconductive surface of the thermoplastic material, and the filter surface should be small compared with the width of the grating line. The same criterion applies to the grain size of the negative film and to the resolution fidelity of the positive printing process. The resolving power, or focusing accuracy of the camera lens is not a factor, nor are film shrinkage and translational motion between filter and film of thermoplastic sheet, because the coding is based exclusively on the spatial filter. The film behind the filter must be panchromatic and color balanced, correcting filters (over the lens) may be needed, depending upon the spectral response of the film and the available illumination. In making positives, however, care need be exercised only with regard to resolution, and it is conceivable that quantity production of positives can use the usual well known reproduction techniques.

In accordance with this invention, maximum separability may be achieved when a plurality of images, such as three color images, stored on a sensitized surface are sought to be reproduced, when in the case of the angularly superimposed grids, the angles made by the lines of the three grids relative to one another are selected such that desired diffracted images fall within regions of the negative which are clearly separable from the other regions of the negative on which the undesired cross product or higher order diffracted images fall. For example, in accordance with this invention, one grid has its lines horizontal, another grid has its lines vertical and the third grid has its lines making an angle of 30° with the horizontal diffraction grating lines. For the nonangularly superimposed grids, the frequencies of the grid lines determine the amount of separation of the diffraction images. For the Fresnel zones, the separation of the zones determines the separability of the images.

Figure 6:
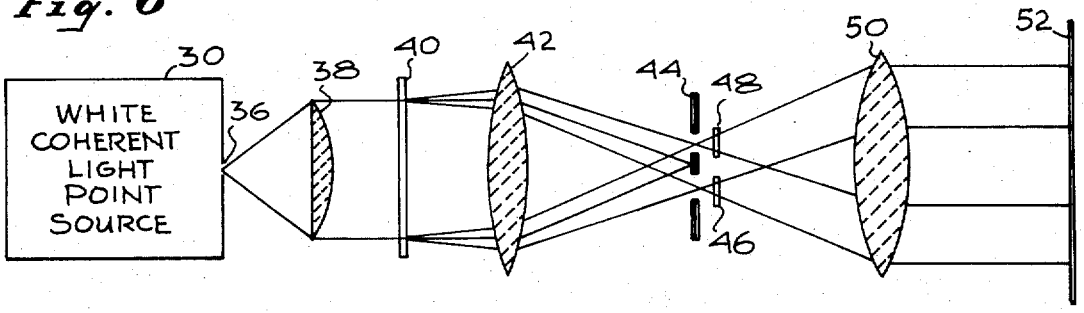
FIGURE 6 is a schematic illustration of an arrangement for reproducing an image, in color, from a photograph taken with the spatial filter shown in FIGURE 2 in accordance with this invention.

FIGURE 6 shows an arrangement for a projection system capable of providing a colored image from thee information carried in the black and white positive, be it film or thermoplastic material. This projector has a bright white point light source 30, the light from which is passed through a pin hole opening 36, to a collimating lens 38 and then passes through the transparency 40, which carries the encoded information. The light which passes through the transparency is then focused by a lens 42 upon a special aperture mask 44. Colored gelatins 46, 48, are inserted at or beyond the openings in the mask, in a manner as will be described subsequently herein, to color the light which passes therethrough. The light which passes through the mask is then focused by a projection lens 50 upon a viewing screen 52. The image on the viewing screen is a colored reproduction of the image which was originally photographed.

Figure 7:
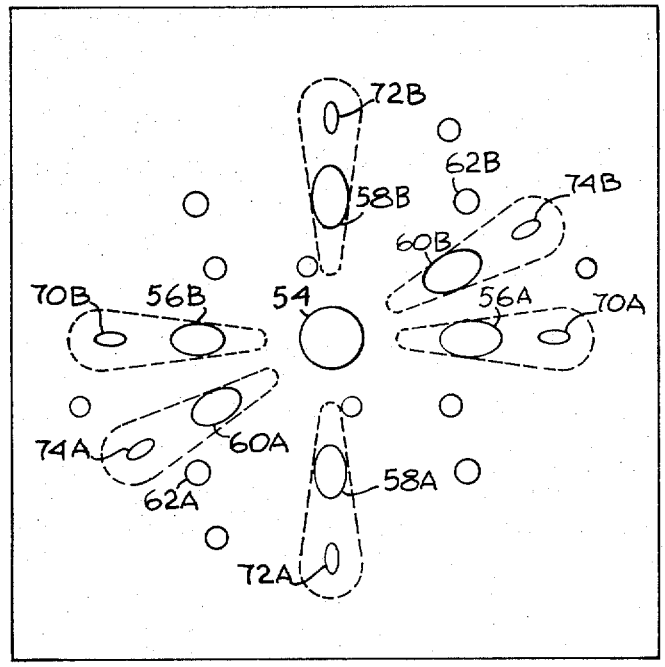
FIGURE 7 represents the diffracted light pattern obtained by passing light through a spatial filter as shown in FIGURE 2.

FIGURE 7 illustrates the diffraction pattern which one would obtain if a screen was placed at the location of the aperture mask 44 when a spatial filter using angularly superimposed grids of lines was used to take a photograph. Due to the line or phase gratings present in the transparency 40, light rays passing through it are bent or diffracted so that in the plane of the mask one would not only have a bright central spot 54, that is the undiffracted image of the opening in the pin hole opening 36, but one would also have three pairs of "satellite spots," respectively 56A, 56B, 58A, 58B, and 60A, 60B. Each such pair is oriented symmetrically about the center spot and is located along an axis normal to the direction of one of the sets of lines in the transparency.

In addition, there is found in the plane of the aperture mask 44, six more pairs of fainter spot 62 typically 62A, 62B, which are formed from light diffracted by arrays of intersections of the three original gratings with one another. (Still more spots 70, 70A, 70B, 72A, 72B, 74A and 74B, are formed by second order diffraction, but they are normally faint enough to be ignored.)

The usual light is that derived from the first order diffracted image, respectively 56A, 56B, 58A, 58B, 60A, 60B, and also that of the higher order diffracted image, such as 70A, 70B, 72A, 72B, 74A, 74B, which is sufficiently strong to be useful. The other images which are derived from the cross product are not used. The dotted lines shown in FIGURE 7 indicate the location for apertures in the mask 44 which would pass only the useful light to the following screen.

Figure 8:
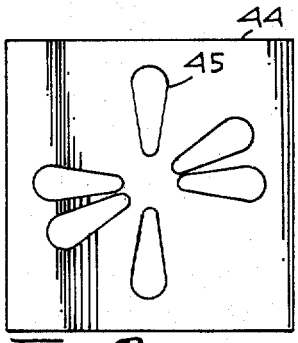
FIGURE 8 illustrates the appearance of a mask which is used in reproducing an image from a photograph taken using a spatial filter of the type shown in FIGURE 2.

FIGURE 8 represents a mask 44 having apertures 45 therein which are disposed in a manner to pass therethrough only the light from the useful diffracted images. This light is black and white and the projection lens 50 can produce a clear black and white image on the screen. If the image due to the central spot 54 would be permitted to pass through the mask 44, the screen would display in response thereto, a duplicate of the panchromatic photograph of the original. However, if this is of interest, it is better projected by a conventional projector.

The three images due to the three pairs of principal satellite spots are the Maxwellian separations of the original scene and need only to be colored red, green and blue, respectively, and superposed to produce a full color image. The six remaining pairs of spots can produce images that are combinations of Maxwellian seeparations taken two at a time and at present no use can be made of them. Accordingly, it will be clear that the aperture mask 44 with the three pairs of wedge-shaped slots serves to pass only the useful light. Gelatin films of the appropriate primary colors are located behind the slots, and when the projection lens is properly positioned to focus an image of the color transparency in the plane of the screen, the resulting picture is in full color and has the six constituent images brought into perfect registration automatically. In addition, the grating structure (which magnification could render visible in an image obtained from the center spot) is not visible in images formed with light from a pair of diffracted spots, although the resolution of the final picture is limited by the number of grating lines per inch. Since the pieces of gelatin behind the aperture mask are readily subject to mechanical manipulation, a considerable amount of color control is feasible. Color balance saturation-desaturation changes for example, may be obtained with neutral density and saturation radiant wedges installed behind the slots. The reason why the orientation for the three line grids was selected may be noted from FIGURE 7. Other choices of orientation would have lead to "cross product" spots falling so close to principal spots as to make spatial separations difficult or impossible. Slot apertures are preferably holes, because they are tolerant of magnification changes. Grating orientation may also take into account possible film scratches or other defects, in the direction of film transport so as to avoid alignment of the scratches with the principal grating.

Figure 9:
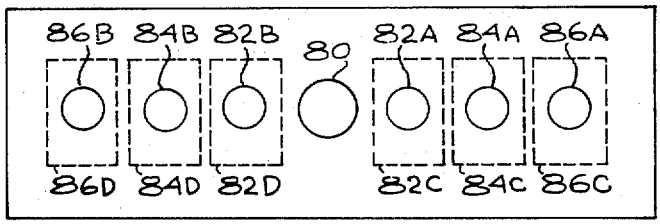
FIGURE 9 illustrates the diffraction image obtained and mask used for reproducing an image when the spatial filter shown in FIGURE 3 is employed.

FIGURE 9 illustrates the first order diffraction image which is obtained when a spatial filter of the type shown in FIGURE 3 is used. The bright "undiffracted" central spot 80 is present plus a pair of "satellite" spots for each grid. The more lines in a grid (or the higher the frequency), the greater the angle of diffraction of the spots associated with that grid. Thus, the spots 82A, 82B represent the diffracted image due to the magenta lines, and the two spots 86A, 86B represent the diffracted image due to the yellow lines. The dotted line rectangles respectively 82C, 82D, 84C, 84D, 86C, 86D represent the apertures which are cut in a mask which is used for decoding a photograph taken with a spatial filter shown in FIGURE 3. It should be obvious that if the lines of the grids in such a mask were horizontally disposed, the diffracted spots shown in FIGURE 9 would be oriented vertically. The rectangular slits in the mask enable line sources of light to be used in the projection system rather than a point source of light. The advantage is that more light is provided.

Figure 10:
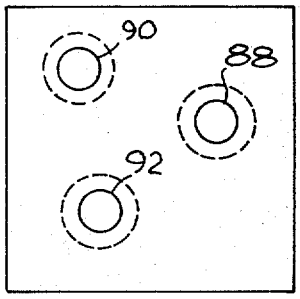
FIGURE 10 illustrates the diffraction image obtained and mask used for reproducing an image when the spatial filter shown in FIGURE 4 is employed.

FIGURE 10 shows the first order diffraction image, which would be obtained when a spatial filter of the type shown in FIGURE 4 is used. Three easily discernible bright spots are provided respectively 88, 90, 92, one for each Fresnel zone. The dotted line circles respectively 88A, 90A, 92A, represent the holes required for permitting only the light from these spots to pass through the decoding mask. The advantage of the Fresnel zone spatial filter is that the resulting image spots have relative large separations, thus enabling the use of relatively large light sources for the projection system. However, the sensitized films employed must have very high film resolution to achieve reasonable focal lengths.

While the projection system shown in FIGURE 6 illustrates the projection of a single transparency, it will be appreciated that this can constitute motion picture film which is moved through a film gate to be exposed in a manner well known to the art. When this is done, the image displayed on the viewing screen is a colored motion picture. Saturation of the image displayed on the screen can simply be controlled by adding various amounts of the central spot image which contains luminance information, and thus, can be used to desaturate the color image.

From the foregoing description, it should be appreciated that the single spatial filter consisting of cyan, magenta and yellow gratings, may be considered as encoding for storage the information for three different images on the negative. Each one of these images can be displayed separately and apart from the others merely by blocking the pairs of slots which otherwise would pass the images which are not desired. Thus, for example, it is possible to store on a single negative three different pictures, rather than the three color components of the same picture using the described techniques. The parallel lines of the respective three gratings may be black and white or in color. Here, however, a single grating is used adjacent the film for each image. The grating has its angle changed by being rotated, for example, between shutter opening times. When the desired number of exposures have been made, the film is changed so that the next color frame is ready for its set of exposures. In this manner, in a motion picture camera, for example, each film frame may be encoded with a number of image frames, each representing modulation of that particular image onto a grating of a specific angle. In the projection process, an arrangement may be employed of the type shown in FIGURE 6, wherein a mask comprising a rotating slit selects only those dots for projection which contain the images recorded when the grating in the camera has assumed a single angular position. The rotating slit stops at each angular position, and thus may be used to sequentially select each picture, masking out all of the undesired groups of dots. As in conventional motion picture photography, the projected image at any point can be broken up using a light chopper to raise the flicker rate and minimize the flicker perception. Once all of the stored images in each film frame are sequentially projected, pull down occurs and the process is repeated on the next film frame.

From the foregoing, it should be appreciated that there has been described and shown herein a novel and useful arrangement for photographing an image of an object on black and white film using a spatial filter, and thereafter producing an image of that object with the colors of the original object. The spatial filters shown all use grids of lines, the Fresnel zones may be considered as grids of circular lines. The lines for each grid are of the same color and each grid is of a different primary color.

What is claimed is:

[1. Apparatus for recording in encoded form a color image on a sensitized surface by directing light from said image onto said surface comprising a spatial filter positioned adjacent said sensitized surface to intercept said light, said filter comprising at least three different diffraction grids thereover, each diffraction grid having a plurality of spaced lines, the spaces between the lines of each diffraction grid passing light of all colors, the lines of a first of said three diffraction grids being of a first primary color and passing light of all but a first color, the lines of a second of said three diffraction grids being of a second primary color and passing light of all but a second color, the lines of a third of said diffraction grids being of a third primary color and passing all but light of a third color.]

[2. Apparatus as recited in claim 1 wherein the lines of each grid are parallel to one another, for each grid the number of lines per unit distance differs from each of the lines of another grid, and said grids are positioned with their lines interleaved and parallel to one another.]

[3. Apparatus as recited in claim 1 wherein the lines of each grid are circular and are concentrically related to one another to form a Fresnel zone, said Fresnel zones being disposed adjacent one another.]

[4. Apparatus as recited in claim 1 wherein the lines of each grid are parallel and equally spaced from one another, said grids being superimposed over one another with lines of each grid making a different angle relative to the lines of another grid.]

5. Apparatus as recited in claim [1] *17* wherein the lines of one of said plurality of grids are cyan, the lines of a second one of said plurality of grids are magenta, and the lines of a third of said plurality of grids are yellow.

6. Apparatus for reproducing in color an image of an object recorded on transparency made by photographing the original of said image on a panchromatic sensitized surface with a spatial filter adjacent thereto, said filter comprising a plurality of grids disposed thereon, each of said grids consists of a plurality of spaced lines of the identical color, each grid line color being that of a different primary color, said apparatus comprising a source of light, means for directing said light at one side of said transparency, means for focusing the light passing through said transparency at a predetermined location, apertured mask means positioned at said predetermined location for passing only predetermined portions of the light focused thereon, said mask having slot apertures thereon disposed about its center, there being two axially aligned slot apertures, one on either side of the center of said mask, associated with each grid of lines in said filter, each two slot apertures being axially aligned to be orthogonal to the location of the grid of lines with which it is associated in the filter as said grid is reproduced on the transparency, a different color filter covering each of said two slot apertures, the colors of said color filters for each of said two slot apertures being the primary colors, and means for displaying the image established by the light which passes all of said slot apertures.

[7. Apparatus for recording in encoded form a color image of a colored object, comprising a sensitized surface, means for directing light from said colored object toward said sensitized surface, and a single filter means in the path of said light and adjacent said sensitized surface, said single filter means having a plurality of different color diffraction grating means, each said different color diffraction grating means having parallel spaced colored lines, the spaces between the lines passing light of all colors and the lines passing light of all colors except a primary color for blocking from said sensitized surface a grid of a primary color of light, and for establishing a different diffraction image on said sensitized surface for each grid.]

8. Apparatus as recited in claim [7] *19* wherein said sensitized surface is a material which records thickness variations in response to light variations.

9. Apparatus as recited in claim [7] *19* wherein said sensitized surface is a material which records phase variations in response to light variations.

10. Apparatus as recited in claim [7] *19* wherein said sensitized surface is a panchromatic negative film.

11. Apparatus for recording in encoded form a color image of a colored object comprising a thermoplastic material having a photoconductive layer over a surface thereover, means for applying a charge to said photoconductive layer, a spatial filter adjacent said photoconductive layer, means for directing light from said colored object to said thermoplastic material through said photoconductive layer, said spatial filter including a plurality of spaced parallel lines, the lines of each grid being identical color and differing from the color of the lines of the other grids, each grid being angularly disposed with respect to each of the other grids.

12. Apparatus for recording by means of a single exposure, a color image in encoded form on a sensitized surface by directing light from said image onto said surface comprising:

a spatial filter positioned adjacent said sensitized surface to intercept said light, said spatial filter comprising a plurality of superimposed diffraction grids, each grid comprising a plurality of spaced parallel lines, the spaces between the lines passing light of all colors, the lines of each grid being of the identical color and differing in color from the lines of the other grids, the lines of each grid passing light of all but one color, the lines of one of said plurality of grids being orthogonal to the lines of a second of said plurality of grids, the lines of a third of said plurality of grids making an angle of 60° with respect to the lines of one of the other grids.

13. A spatial filter comprising three grids of lines, the spaces between the lines passing light of all colors, the lines of a grid being parallel, spaced from one another and being of an identical primary color, the color of the lines of each grid being different than the color of the lines of the other grids, the lines of each grid passing light of all but one color, two of said grids of lines being orthogonal to one another, and the third grid of lines making an angle of 60° with one of the other two grids.

[14. A spatial filter comprising a plurality of grids of lines, the lines of a grid being parallel, spaced from one another and being of an identical primary color. the color of the lines of each grid being that of a different primary color than the color of the lines of the other grids, the lines of each grid occurring at a different frequency than the lines of the other grids, said grids having their lines interleaved and parallel with one another.]

15. A spatial filter comprising a plurality of grids of lines, the lines of a grid being parallel, spaced from one another and being of an identical primary color, the color of the lines of each grid being that of a different primary color than the color of the lines of the other grids, the lines of each of said grids forming a Fresnel zone, said zones being disposed adjacent to one another.

*16. Apparatus for recording in encoded form a color image on a sensitized surface by directing light from said image onto said surface comprising:*

*a spatial filter positioned adjacent said sensitized surface to intercept said light, said filter comprising at least three different diffraction grids thereover,*

*each diffraction grid having a plurality of spaced concentrically circular lines forming a Fresnel zone, said Fresnel zones being disposed adjacent to one another,*

*the spaces between the lines of each diffraction grid passing light of all colors,*

*the lines of a first of said three diffraction grids being of a first primary color and passing light of all but a first color,*

*the lines of a second of said three diffraction grids being of a second primary color and passing light of all but a second color,*

*the lines of a third of said three diffraction grids being of a third primary color and passing light of all but a third color.*

*17. Apparatus for recording in encoded form a color image on a sensitized surface by directing light from said image onto said surface comprising:*

*a spatial filter positioned adjacent said sensitized surface to intercept said light, said filter comprising at least three different diffraction grids thereover,*

*each diffraction grid having a plurality of spaced lines, the lines of each grid being parallel and equally spaced from one another,*

*said grids being superimposed over one another with lines of each grid making a different angle relative to the lines of another grid,*

*the spaces between the lines of each diffraction grid passing light of all colors,*

*the lines of a first of said three diffraction grids being of a first primary color and passing light of all but a first color,*

*the lines of a second of said three diffraction grids being of a second primary color and passing light of all but a second color,*

*the lines of a third of said diffraction grids being of a third primary color and passing all but light of a third color.*

*18. Apparatus for recording as recited in claim 17 wherein the number of lines per unit distance for each one of the grids is substantially the same.*

*19. Apparatus for recording in encoded form a color image of a colored object, comprising a sensitized surface,*

*means for directing light from said colored object toward said sensitized surface, and*

*a single filter means in the path of said light and adjacent said sensitized surface, said single filter means having a plurality of different color diffraction grating means,*

*each said different color diffraction grating means having parallel spaced colored lines, the spaces between*

*the lines passing light of all colors, the lines of each diffraction grating passing light is all colors except a primary color which is different for each diffraction grating for blocking from said sensitized surface a grid of a primary color of light, and for establishing a different diffraction image on said sensitized surface for each grid,*

*all of said diffraction grating means being superimposed over one another with the lines of each grating making a different angle with respect to the lines of each of the other gratings.*

References Cited

The following references, cited by the Examiner, are of record in the patented file of this patent or the original patent.

UNITED STATES PATENTS

| | | | |
|---|---|---|---|
| 2,050,417 | 8/1936 | Bocca | 352—45 |
| 3,284,196 | 11/1966 | Mazza | 96—1.1 |
| 2,813,146 | 11/1957 | Glenn | 350—162 SF |

OTHER REFERENCES

"New Color Projection System," by W. E. Glenn, November 1958, Journal of the Optical Soc. of America, vol. 48, No. 11.

SAMUEL S. MATTHEWS, Primary Examiner

R. P. GREINER, Assistant Examiner

U.S. Cl. X.R.

350—162 SF; 355—4, 32, 71